United States Patent [19]  [11] 3,892,300
Hapeman et al. [45] July 1, 1975

[54] MOTORIZED WHEEL BRAKE SYSTEM

[75] Inventors: Martin Jay Hapeman; Joseph Anthony Kobylinski, both of Erie, Pa.

[73] Assignee: General Electric Company, Erie, Pa.

[22] Filed: Aug. 22, 1973

[21] Appl. No.: 390,552

[52] U.S. Cl. ............... 192/2; 74/391; 74/421 A; 180/65 F
[51] Int. Cl. .................. B60k 29/02; B60k 7/00
[58] Field of Search ......... 192/2 R, 3 W; 180/65 F, 180/60, 62; 74/391, 411.5, 421 A; 64/9 R, 23

[56] References Cited
UNITED STATES PATENTS

| | | | |
|---|---|---|---|
| 3,035,652 | 5/1962 | McLean | 180/60 X |
| 3,117,430 | 1/1964 | Mueller | 64/9 R |
| 3,132,494 | 5/1964 | Hoffer | 64/9 R |
| 3,161,249 | 12/1964 | Bouladon et al. | 180/65 F X |
| 3,163,250 | 12/1964 | Gibson | 180/65 F X |
| 3,302,739 | 2/1967 | Beck et al. | 180/65 F |
| 3,608,661 | 9/1971 | Arnot | 180/65 F |

FOREIGN PATENTS OR APPLICATIONS

| | | | |
|---|---|---|---|
| 156,852 | 6/1963 | U.S.S.R. | 180/65 F |

Primary Examiner—Benjamin W. Wyche
Attorney, Agent, or Firm—D. F. Bigelow

[57] ABSTRACT

The drive shaft of an electric motor which transmits power through a gear train to a surrounding wheel, is extended beyond the gear train and a friction brake is rigidly attached thereto for selective application of braking torque through the gear train without having to pass through the armature shaft assembly. The system may be utilized to supplement a similar brake located on the opposite commutator end of the motor. Bearing support for the drive shaft extension is provided by a collar attached to the gear housing and an arrangement of crowned spline couplings allows for the free floating of a sun pinion in the gear train.

20 Claims, 2 Drawing Figures

MOTORIZED WHEEL BRAKE SYSTEM

BACKGROUND OF THE INVENTION

This invention relates generally to vehicular brake systems and more particularly to brakes of the disc type which operate through the gear train of a motive vehicle.

A common mechanism used for propelling pneumatic tired vehicles is known as the motorized wheel, and comprises an electric motor mounted to the frame of the vehicle for motive rotation of a wheel rotatably disposed around the motor. Transmission of power is generally accomplished by a gear train operably connected between the wheel and the motor drive shaft on the inner end of the motor.

In such motorized wheels the type of motor used is generally of the d-c type, wherein a commutator is necessarily a part of the rotor. Since the commutator and its associated brushes require frequent periodic inspection and maintenance, it is best to locate the commutator at the outer side of the vehicle to facilitate easy access thereto.

The braking assembly of conventional designs is commonly a disc brake mounted on the commutator end of the armature shaft, and is designed to provide adequate accessibility to the commutator of the motor, thus establishing a limit in brake size and capacity. For the same reason the use of additional discs and calipers to facilitate emergency and parking brake systems is not practical since these would provide a hindrance to efficient maintenance of the commutator assembly. An additional limitation inherent to the conventional system is that during friction braking, braking torque is transmitted to the sun pinion via the same drive used for propulsion and dynamic retarding functions. In the event of a failure in that drive, not only will the propulsion and dynamic retarding functions be incapacitated, but so also will be the friction brake system.

An alternate braking system of the prior art provides braking torque at one or more points in the gear train intermediate the drive shaft and the wheel. For example, in a planetary gear system a brake may be applied to the shaft(s) of the planet gear(s). This allows a torque to be applied without being transmitted through the armature drive as discussed hereinabove, but there is then a decreased mechanical advantage since the torque is not applied through the entire gear train, and again the braking capacity is limited.

It is therefore an object of this invention to provide a motorized wheel with an additional brake system which does not impair the accessibility to the motor commutator and associated brushes.

Another object of this invention is the provision for a brake system which is not incapacitated in the event of the sun pinionarmature drive failure.

A further object of this invention is the provision for the transmission of braking torque through a different drive media than that of propulsion torque and dynamic retarding torque.

Yet another object of this invention is the provision for a brake system which uses all the available mechanical advantage of the gear train in transmitting torque.

Another object of this invention is the provision for an additional braking system with a simple modification of the present system.

Still another object of this invention is the provision for an additional brake system without adding outboard (commutator end) dimensions to the motorized wheel.

Yet a further object of this invention is the provision for a brake system which is economical to manufacture, simple in construction, and effective in use.

These objects and other features and advantages become more readily apparent upon reference to the following description when taken in conjunction with the appended drawings.

SUMMARY OF THE INVENTION

In accordance with one embodiment of the invention the sun pinion, which conventionally interconnects the drive end of the rotor to the planetary gear train, is extended beyond the gear case housing, and a brake disc is attached thereto for frictional engagement by a frame mounted caliper. Braking torque can thus be applied to the sun pinion shaft, through the gear train, to the wheel. Full mechanical advantage is taken of the gear train and the torque is transmitted through a drive other than that which transmits the propulsion and dynamic retarding torque. This system can be used as the sole friction brake system or as a supplement to the conventional brake system on the commutator end of the rotor.

In addition to providing a supplementary brake system to serve as an emergency brake, the proposed system provides an excellent mounting location for a parking brake caliper common to the supplementary brake disc. The proposed system allows for mounting the subject parking brake with little or no interference with maintenance.

Bearing support of the extended pinion shaft assembly is provided by an arrangement wherein a coaxial collar extends outwardly from the disc and is bearing mounted in an arcuate flange extending from the gear box housing. Such an arrangement allows a free floating action of the sun pinion.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
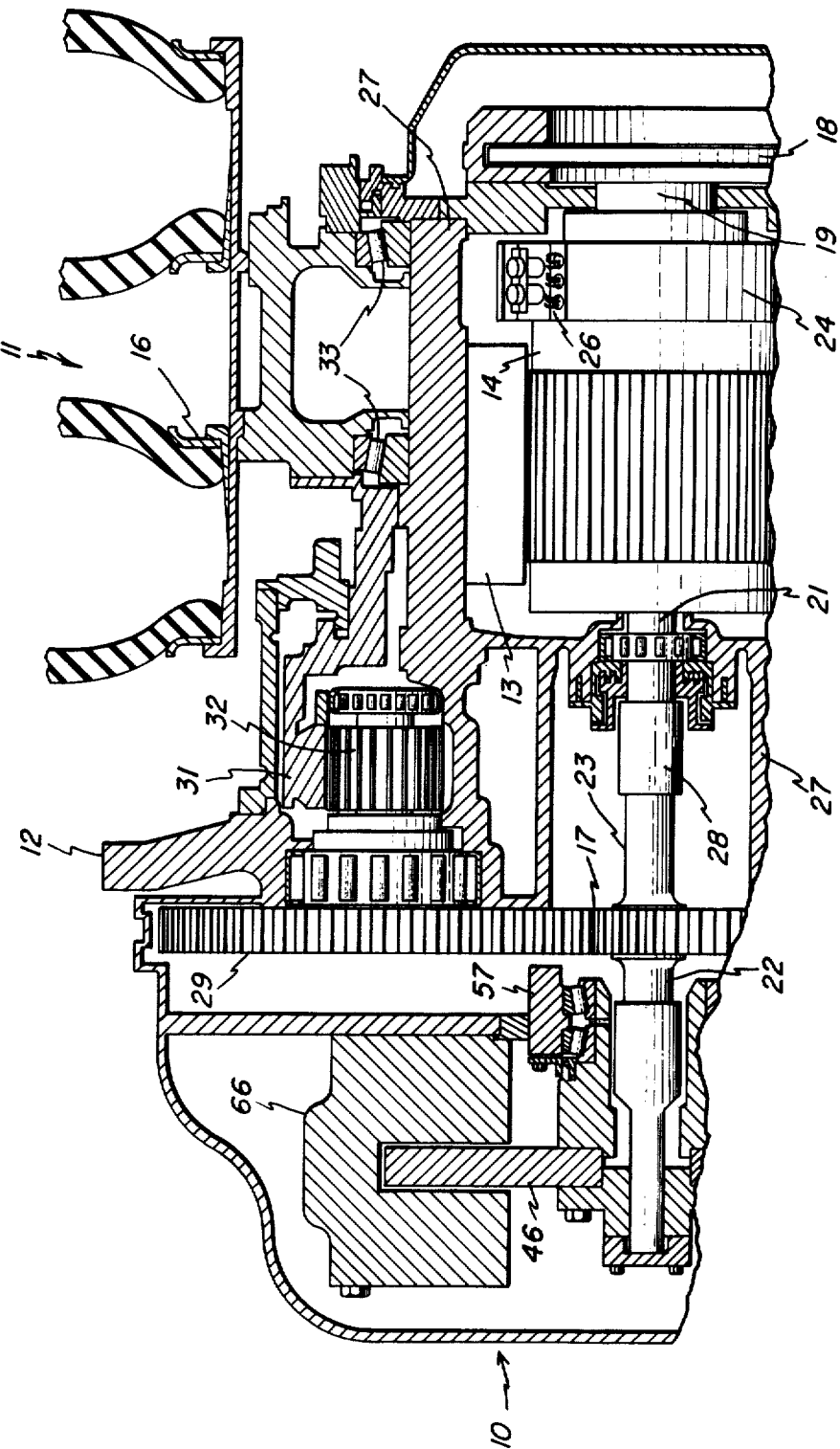
FIG. 1 is a partial cross sectional view of a motorized wheel with the brake system shown in accordance with the preferred embodiment of the invention.

Referring now to the drawings, the invention is shown generally at 10 in FIG. 1, wherein an otherwise conventional motorized wheel 11 is depicted. A frame 12 attached to the driven vehicle (not shown) supports an electric motor 13 whose rotor 14 powers the rotatable wheel hub 16 through a planetary gear train 17. Conventionally, braking torque is applied by a disc brake 18 at the commutator end 19 of the rotor. The present invention places a friction brake assembly 10 at the drive-end 21 of the rotor for application of braking torque through an extended portion 22 of a sun pinion drive shaft 23. It should be noted that the specific type of friction brake installed is not significant to this invention, the type illustrated being shown for the purpose of description. Although a disc type brake may be preferable in many instances, the characteristics of a drum or other type may be desirable in specific instances.

The motorized wheel 11 is of the type commonly used for offhighway vehicle application, as for example, on large hauling trucks. Electrical power is generated by a prime mover (e.g. a diesel engine) carried aboard the vehicle and is delivered to the electric motor 13 for propulsion of the vehicle. The motor 13 is typically of the d-c type wherein current is provided to its commutator 24 by brushes 26.

The motor stator 27 has a dual purpose in acting both as the magnet frame for carrying motor flux and also as the axle which bears the rotatable wheel hub 16. It is integrally connected to the frame 12 which is fastened to the vehicle in such a manner as to additionally house the planetary gear train 17.

Figure 2:
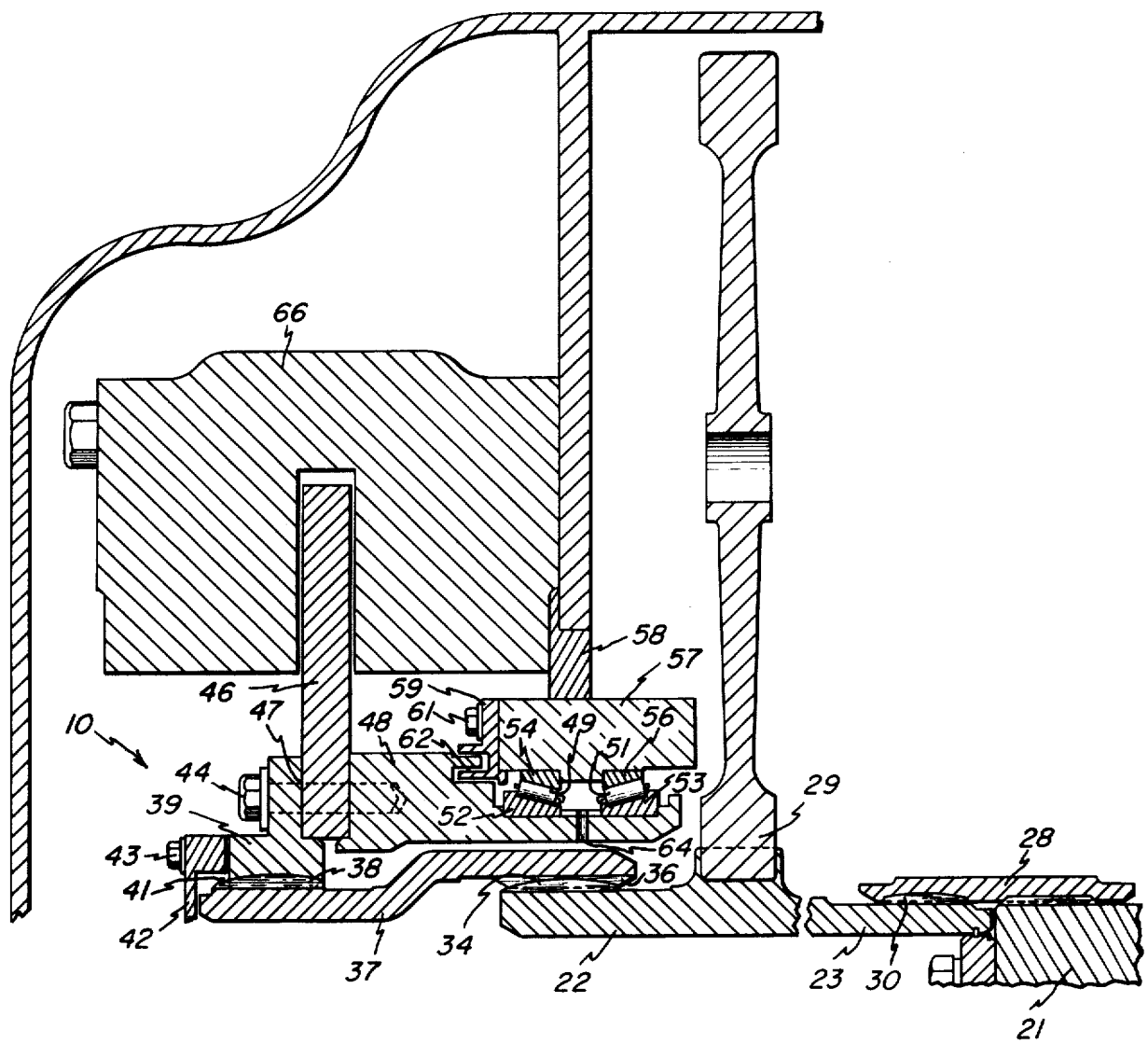
FIG. 2 is an enlarged sectional view of the brake portion thereof.

Driving connection is made between the motor rotor 14 and the planetary gear train 17 by the sun pinion 23 coupled to the rotor drive-end 21 by an intermediate coupling 28, commonly of the spline type as shown in FIG. 2. The sun pinion 23 has an external spline 30 on its outer end, and near its inner end it meshes with the planetary gears 29 which in turn drive the ring gear 31 by way of their planet pinions 32. The tire mounted wheel hub 16 is secured to and carried by the ring gear 31. It is rotatably mounted in coaxial relationship to the stator 27 by a pair of axially spaced, taper roller bearings 33 mounted on the periphery of the stator.

Referring now to FIG. 1 and more specifically to FIG. 2, a preferred embodiment of the brake assembly 10 is shown wherein the sun pinion shaft 23 has integrally attached thereto the extended portion 22 which projects inwardly toward the vehicle frame, and has formed on its periphery an external spline 34. Mating therewith is an internal spline 36 formed at one end of a jogged coupling 37 which further extends inwardly toward the vehicle. The external spline 38 formed on the opposite end of the coupling 37, has fitted thereon a brake hub 39 secured by means such as a snap ring 41 as shown in FIG. 2. Splines 34 and 38, as well as spline 30, are crowned in a conventional manner so as to allow a floating action of the sun pinion 23 to facilitate proper gear characteristics. An end plate 42 is placed over the joint and secured to the hub 39 by bolts 43 for the purpose of retaining the lubricating oil and preventing the entry of dirt therein. Attached to the hub 39 by a plurality of bolts 44, is a brake disc 46 of the conventional type. The bolts 44 pass through holes 47 formed in the disc 46 to threadably engage a cylindrical barrel sleeve 48 on the outer side of the disc 46. The coupling 37, hub 39, disc 46 and barrel sleeve 48 then form a rigid assembly, with the barrel sleeve 48 extending outwardly in parallel relationship to the coupling 37, to provide a support function for the assembly. This is accomplished by mounting its outer free end in a bearing assembly supported from the gear case housing. A typical mounting is shown in FIG. 2 wherein a pair of tapered roller bearings 49 and 51 engage and support the inner racer 52 and 53 on the outer portion of the barrel sleeve. The bearing outer races 54 and 56 are disposed in a support cylinder 57 attached to the gear case housing 58. A cap 59 is secured to the support cylinder 57 by a bolt 61 with its inner portion interacting with the barrel sleeve 48 to form a labyrinth seal 62.

Lubrication of the assembly is accomplished along with that of the gear train, by the splash method from a sump (not shown) at the bottom of the gear case housing (see FIG. 1). A hole 64 is preferably formed in the barrel sleeve 48 to facilitate circulation of the lubricants within the assembly.

Braking torque is applied to the gear train by a brake caliper 66 which is mounted to the vehicle frame and frictionally engages the disc 46 in a conventional manner. Typically the caliper is controlled by hydraulic means to selectively apply the desired amount of frictional engagement.

What I claim as new and desire to secure by Letters Patent of the United States is:

1. A motorized wheel drive system for propelling a vehicle comprising:
    a. a frame adapted to be secured to the vehicle;
    b. an electric motor mounted to said frame with its rotor aligned transversely to the direction of intended vehicle travel;
    c. a drive shaft extending from one end of said rotor;
    d. wheel means in outer concentric relationship to said motor and mounted so as to be rotatable in respect to said frame;
    e. gear means drivably connecting said drive shaft to said wheel and comprising a sun pinion having first and second shaft portions extending from opposite sides of the pinion;
    f. first coupling means drivably coupling said drive shaft to said first shaft portion so as to permit axial misalignment between said drive shaft and said first shaft portion;
    g. braking means comprising a rotatable brake member secured for rotation about a predetermined axis;
    h. second coupling means drivably coupled at one of its ends to said second shaft portion and at the other of its ends to said rotatable brake member so as to permit said second coupling means to be in axial misalignment with both said rotatable brake member and said second shaft portion whereby said sun pinion is free to float in its radial direction.

2. The motorized wheel drive system as set forth in claim 1 wherein said drive shaft and said first shaft portion are spline coupled to said first coupling means, and said braking member and said second shaft portion are spline coupled to said second coupling means.

3. The motorized wheel drive system as set forth in claim 2 wherein said drive shaft and said first shaft portion each comprise external crowned splines cooperating with internal splines of said first coupling member.

4. The motorized wheel drive system as set forth in claim 2 wherein said second shaft portion comprises external crowned splines and said rotatable brake member comprises internal splines, said second coupling comprising at its one end internal splines adapted to be coupled to the external crowned splines of said second shaft portion, and said second coupling comprises at its other end external crowned splines adapted to be coupled to the internal splines of said rotatable brake member.

5. The motorized wheel drive system as set forth in claim 1 wherein said rotatable brake member of the friction braking means comprises a brake hub and a disc rigidly attached to said hub for engagement by a braking caliper.

6. A motorized wheel drive system as set forth in claim 5 wherein said friction brake means includes a barrel sleeve rigidly attached to said hub and projecting outwardly in concentric relationship with said dual coupling member.

7. A motorized wheel drive system as set forth in claim 6 and including bearing support means disposed between said barrel sleeve and said frame.

8. A motorized wheel drive system as set forth in claim 7 wherein said bearing support means comprises a pair of tapered roller bearings whose races are partially formed by said barrel sleeve, thereby maintaining said barrel sleeve on a fixed axis.

9. A motorized wheel drive system as set forth in claim 7 and including a lubricant seal interposed between said frame and said barrel sleevel.

10. An improved motorized wheel drive system of the type having a magnet frame, a rotor rotatably mounted therein and a wheel hub supported by said magnet frame, and a gear train drivably interconnecting the rotor to the wheel hub, the improvement comprising:
   a. said gear train comprising a sun pinion;
   b. crowned spline coupling means for interconnecting said sun pinion at its rotor end to said rotor;
   c. said sun pinion having an extended other end projecting beyond the plane of said gear train;
   d. brake means comprising a brake hub member adapted to be driven by said extended end for selectively applying a braking torque through said gear train to said wheel hub;
   e. dual coupling means connected at its one end to said sun pinion extended end by a crowned spline arrangement and connected at its other end to said brake hub by means of a crowned spline arrangement such that the axis of said dual coupling means is variable from coincidence with the axis of said sun pinion and said sun pinion is disposed as to be free to float in its radial direction.

11. An improved motorized wheel drive system as set forth in claim 10 wherein said brake means includes a disc rigidly attached to said hub for selective frictional engagement by a frame mounted caliper.

12. An improved motorized wheel drive system as set forth in claim 10 wherein said brake means further includes a barrel sleeve rigidly attached to said hub and extending in a generally concentric relationship to said dual coupling member.

13. An improved motorized wheel drive system as set forth in claim 12 and including bearing support means disposed between said barrel sleeve and said frame.

14. An improved motorized wheel drive system as set forth in claim 13 wherein said bearing support means comprises a pair of tapered roller bearings whose races are partially formed by said barrel sleeve thereby maintaining said barrel sleeve on a fixed axis.

15. An improved motorized wheel drive system as set forth in claim 14 and including a lubricant seal disposed between said barrel sleeve and said frame.

16. A motorized wheel drive system for propelling a vehicle comprising:
   a. a frame secured to the vehicle;
   b. an electric motor mounted to said frame with its rotor aligned transversely to the direction of intended vehicle travel;
   c. a drive shaft connected to and extending from one end of said rotor;
   d. a wheel rotatably mounted on said frame in outer concentric relationship to said motor;
   e. gear means drivably connecting said drive shaft to said wheel, comprising a sun pinion, said drive shaft coupled to said sun pinion and extending beyond the plane of said gear means;
   f. friction brake means comprising a brake hub attached to said drive shaft extension for selectively applying a braking torque through said gear means to said wheel;
   g. said sun pinion comprising an associated shaft having crowned splines on either end thereof;
   h. coupling means for coupling one end of said associated shaft to said drive shaft;
   i. said drive shaft extension comprising a dual coupling member attached at its one end to the other end of said associated shaft and at its other end by a crowned spline arrangement to said brake hub, whereby said sun pinion is free to float in a radial direction; and
   j. an end plate secured to the inner end of said hub so as to form a lubricant seal between said hub and said dual coupling member.

17. An improved motorized wheel drive system of the type having a magnet frame mounted to the vehicle, a rotor rotatably mounted therein, a wheel hub rotatably mounted on the magnet frame and supported thereby, and a housed gear train drivably interconnecting the rotor to the wheel hub, wherein the improvement comprises:
   a. a sun pinion interconnected at its rotor end to said rotor and having an extended other end projecting beyond the plane of said gear train;
   b. means for coupling a hub to said sun pinion extended end;
   c. a brake element rigidly attached to said hub for frictional engagement by an associated pressure bearing element;
   d. a collar rigidly attached to said hub and extending toward the gear train housing; and
   e. a seal disposed between said collar and said gear housing such that said gear housing, coupling means, hub means, collar means, and seal form a compartment for retaining lubricant while said disc remains outside thereof.

18. An improved motorized wheel drive system as set forth in claim 17 and including bearing support means disposed between said collar and said gear housing.

19. An improved motorized wheel drive system as set forth in claim 18 wherein said bearing support means comprises a pair of tapered roller bearings whose internal races are formed by said collar such that the sxis of said collar is maintained in a fixed position.

20. An improved motorized wheel drive system as set forth in claim 18 wherein said gear train and said brake disc are mounted on the inboard side of said rotor.

* * * * *